United States Patent [19]
Rosow et al.

[11] Patent Number: 5,980,373
[45] Date of Patent: Nov. 9, 1999

[54] SHRIMP PEELING APPARATUS

[76] Inventors: Ben Rosow, 6034 Magazine St. #C, New Orleans, La. 70118; Brent A. Ledet, 607 Severn Ave., Metairie, La. 70001; Raul O. Cabezas, 625 Petit Berdot Dr., Kenner, La. 70065; Scott J. Sirgo, 123 Fairway Dr., Covington, La. 70433

[21] Appl. No.: 09/146,068

[22] Filed: Sep. 2, 1998

[51] Int. Cl.[6] .................................................. A22C 29/02
[52] U.S. Cl. ...................................... 452/5; 452/2; 452/9
[58] Field of Search .................................... 452/5, 1, 2, 9

[56]     References Cited

U.S. PATENT DOCUMENTS

| | | |
|---|---|---|
| 2,429,828 | 10/1947 | Lapeyre et al. . |
| 2,537,355 | 1/1951 | Lapeyre et al. . |
| 2,574,044 | 11/1951 | Lapeyre et al. . |
| 2,637,065 | 5/1953 | Lapeyre et al. . |
| 2,778,055 | 1/1957 | Lapeyre et al. . |
| 3,070,832 | 1/1963 | Lapeyre . |
| 3,383,734 | 5/1968 | Lapeyre . |
| 3,626,551 | 12/1971 | J.M. Lapeyre . |
| 3,706,113 | 12/1972 | Lapeyre et al. . |
| 3,740,795 | 6/1973 | Cox . |
| 3,816,877 | 6/1974 | Bullock . |
| 3,971,102 | 7/1976 | Skrmetta . |
| 3,975,797 | 8/1976 | Grimes et al. . |
| 4,400,849 | 8/1983 | Dell . |
| 5,005,258 | 4/1991 | Griffis . |
| 5,108,342 | 4/1992 | Lapeyre et al. . |
| 5,120,265 | 6/1992 | Ledet et al. . |
| 5,346,424 | 9/1994 | Chiu et al. . |

*Primary Examiner*—Willis Little
*Attorney, Agent, or Firm*—Garvey, Smith, Nehrbass & Doody, LLC

[57]     ABSTRACT

A shrimp peeling apparatus provides an improved geometry that increases efficiency and yield. The apparatus has particular utility when used to peel Pendulous Borealis variety shrimp. The apparatus includes a support frame that supports a first plurality of rollers wherein the central longitudinal axis of each of the rollers of the first plurality lies in a common inclined plane. A second plurality of insert rollers is supported by the first plurality of rollers, wherein the diameter of each of the first plurality of rollers is much greater than the diameter of each of the second plurality of insert rollers. An improved geometry governs the respective positions of the smaller diameter insert rollers relative to the common plane of the larger diameter rollers.

38 Claims, 10 Drawing Sheets

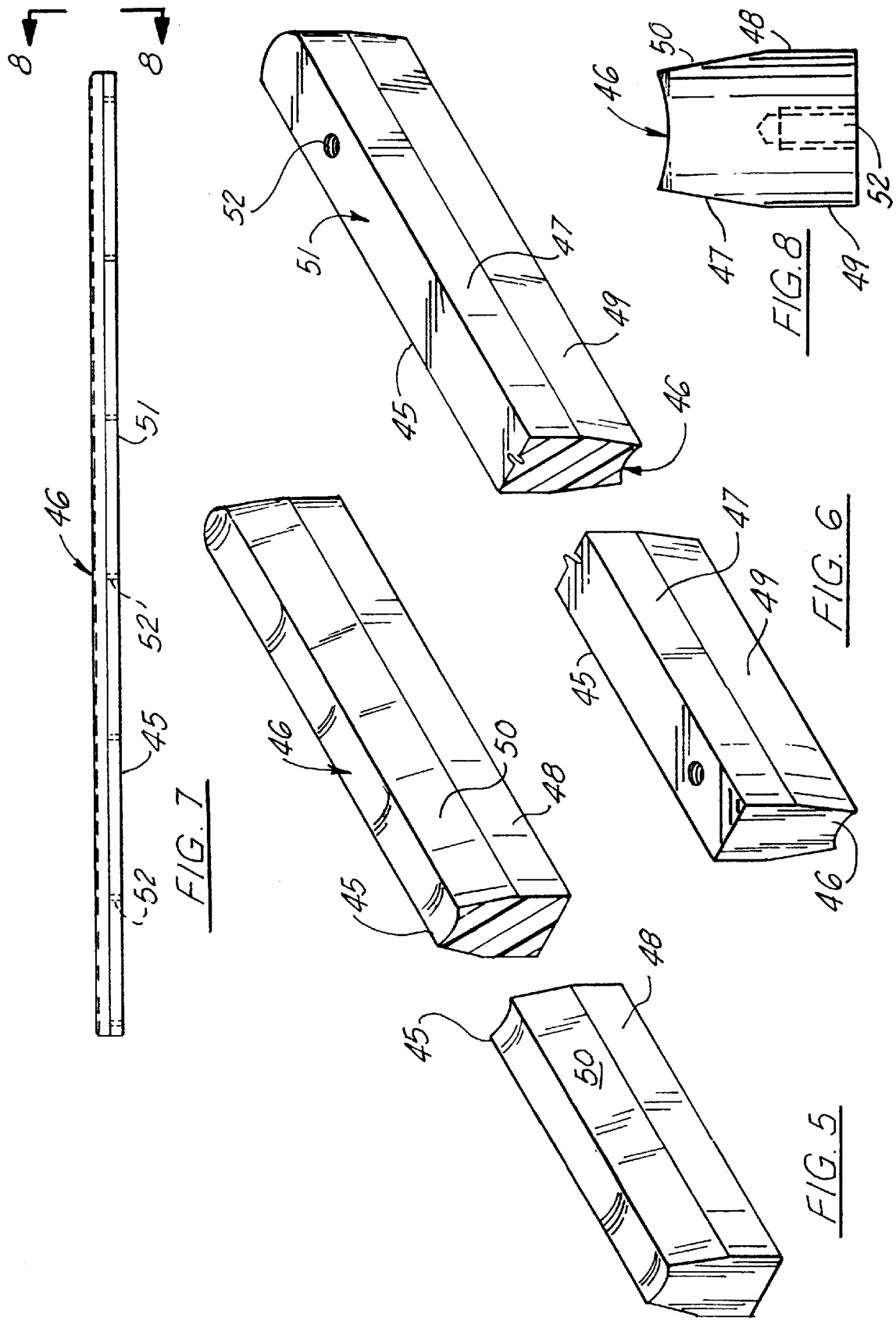

SHRIMP PEELING APPARATUS

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to shrimp peeling devices, and more particularly to a method and apparatus for peeling shrimp that includes alternating larger diameter rollers and smaller diameter insert rollers positioned side-by-side having an improved geometry to enhance peeling of shrimp, especially the Pandalus Borealis variety. Even more particularly, the present invention relates to an improved shrimp peeling apparatus wherein a first plurality of rollers of a first larger diameter lie in a common plane and a second plurality of smaller diameter insert rollers nest respectively in between the first plurality of rollers, one smaller insert roller placed in between two adjacent larger rollers to form a peeling "nip" therewith, and wherein a particular angle of between 20 and 32 degrees is formed by a line intersecting the common plane and the central longitudinal axis of one of the smaller rollers. The apparatus also includes longitudinally extending dividers that are placed in close proximity to the larger diameter rollers and along the length thereof for holding the shrimp in between two adjacent dividers, to enhance peeling.

2. General Background of the Invention

In about 1947, Fernand S. Lapeyre and James M. Lapeyre were faced with the problem of peeling shrimp with a mechanized peeler. The shrimp peeler that they invented made it no longer necessary to rely upon hand labor to sort, peel, or clean shrimp. Early patents that relate to these Lapeyre shrimp peelers include U.S. Pat. Nos. 2,637,065; 2,537,355; 2,574,044; and 2,429,828.

An example of these early patents is the Lapeyre Patent 2,537,355 entitled "Machine For Peeling Shrimp". The '355 patent discloses a machine for peeling shrimp that includes a channel through which the shrimp are adapted to move comprising a base roller and two spaced channel rollers above and in contact with opposite side portions of the base roller to provide a nip running longitudinally at each side of the channel. Means are provided on the machine to impart an oscillatory motion to the base roller to move the shrimp in the channel from one side nip to the other.

The Lapeyre Patent 2,778,055 discloses a machine for peeling shrimp that includes a bottom roller on the machine, parallel side rollers on the machine disposed on opposite sides of the bottom roller and spaced therefrom, and elevated therefrom to form a peeling channel with the bottom roller for the shrimp. Insert rollers are operatively associated with the machine and positioned between the bottom and side rollers. A hold down arrangement is provided for the insert rollers that is operatively associated with the bottom and side rollers extending movably down through the spaces between the bottom and side rollers having a resilient connection to the machine. The '055 patent names Fernand Lapeyre, James Lapeyre, and Emile Lapeyre as inventors.

U.S. Pat. No. 3,070,832, entitled "Pressure Finger Loading Device For A Shrimp Peeling Machine", names Fernand S. Lapeyre as inventor. The '832 patent relates to a pressure finger loading device for a shrimp peeling machine and has for an object to provide means for loading differentially or equally and simultaneously all of the pressure fingers carried in a pressure-finger frame such as the pressure finger frame illustrated in U.S. Pat. No. 2,778,055.

An apparatus for peeling pre-cooked shrimp is the subject of U.S. Pat. No. 3,383,734, issued to James M. Lapeyre. The '734 patent includes a first peeling section having members forming peeling nips positioned to receive shrimp hot from a cooker. The first peeling section has pressure means for urging the shrimp into contact with said members forming said peeling nips. A second peeling section is positioned to receive shrimp from the discharge end of the first peeling section. The second peeling section has peeling nips defined by members having different coefficients of friction between themselves and the second peeling section being devoid of any pressure means for urging the shrimp into contact with the members forming the peeling nips. The second peeling section is up to one-half the length the first peeling section.

A drive mechanism for a shrimp peeling machine is disclosed in U.S. Pat. No. 3,626,551, issued to James M. Lapeyre. The '551 patent is directed to driving the peeling rollers of a shrimp peeling machine and the pressure finger frames mounted thereover by a pitman arm actuated bell crank, which rocks on a cam shaft or a pair of cam shafts which raises and lowers the pressure finger frame and simultaneously drives the peeling rollers.

U.S. Pat. No. 3,706,113 provides a shrimp peeling machine that is directed to hold down devices for insert rolls on shrimp peeling machines and embodies an upright member subject to being spring loaded at its base and carrying a cross beam member proximate its top which is retained in a loose fit by a plastic filler material which will permit the cross beam to rock relative to an upright member. Each end of the cross beam member is hooked downwardly to pass through and restrain insert roll hold down straps.

U.S. Pat. No. 3,740,795, issued to James Cox and entitled "Seafood Peeler Using Rollers Of An Endless Conveyor And A Bank Of Inclined Rollers" discloses a machine that peels seafood such as shrimp. The seafood is delivered to rollers. When the contacting surface between the rollers moves downward, they draw the shell through and reject the slippery meat. On the reverse movement of the surfaces, the rejected meat is carried over the second roller to the next.

U.S. Pat. No. 3,816,877, issued to Kenneth Bullock, discloses a shrimp cleaning machine. The '877 patent is directed to cleaning marine life such as shrimp by passing the shrimp down between spaced peeling rolls and having a vertically reciprocating plate therebetween with the rolls on movable centers positioned as a function of the plate shape and position, with the plate having shaped sides with a traveling belt moving over the top edge of the plate for carrying away the cleaned shrimp. The rolls have an outer surface of a predetermined hardness and material rotating at a predetermined speed with the plate vertically reciprocating at a predetermined speed and a spray provided for cleaning the rolls and plate and forcing uncleaned shrimp into the nips between the rolls and plate.

U.S. Pat. No. 3,971,102, issued to Skrmetta, discloses a roller for shrimp peeling machines that include a gapped portion along its length, for example at its upper end, to effectively shorten the effective peeling section of the machine without substantial modification of the basic machine itself by allowing the shrimp to fall through the gapped portion rather than traversing the full length of the roller. The gapped rollers are substituted for the standard peeling rollers which provide peeling action along their full length, when a shorter peeling section is desired. Several different gapped rollers are disclosed, some reversible end-for-end and others forming a series of subsequently related rollers which have a varying location of the gap portion along the roller length.

U.S. Pat. No. 3,975,797, issued to Grames et al., is directed to a shrimp processing apparatus. In the '797 patent, cooked shrimp to be peeled are distributed successively to tiers of sets of peeler rolls and cooperative reciprocative bars. The apparatus is said to permit coordinated adjustments of nip spacing and taper angle in the roll-bar tiers independently at corresponding ends of the sets and in each tier independently of the other to permit optimum shucking in the first tier and polishing in the second tier suited to type and condition of shrimp. Cams are engaged by cam follower rollers connected to the peeler rolls to control nip distance between the bar and rolls at both ends as a function of relative vertical positioning of each bar and its associated peeler rolls.

The Dell Patent 4,400,849 discloses a shrimp peeling unit that features a pair of journaled generally horizontal and parallel side-by-side rollers including at least closely adjacent sides defining an elongated upwardly opening "nip" area therebetween. Structure is provided for supplying successive shrimp to be peeled to one end of the "nip" area and drive structure is operatively connected to the rollers for inversely oscillating the latter. The drive structure includes adjustment features operative to adjust the angular extent of oscillation of the rollers, the phase change speed of oscillation of the rollers and the cycle frequency of oscillation of the rollers. Further, a row of fingers are mounted for adjustable speed movement along the "nip" area and are engageable with the shrimp within the "nip" area for urging the shrimp therealong and spray heads are arranged along the "nip" area for directing spray jets of liquid into the "nip" area for assisting in the removal of the shells of the shrimp and also the cleaning of the shrimp being peeled or shelled.

In the Griffis Patent 5,005,258, a plurality of shucked shellfish are mechanically eviscerated utilizing a series of longitudinally aligned inclined channels, each channel formed of a power-driven roller and adjacent insert rollers. The insert rollers extend generally parallel and longitudinally and are aligned with each other. The frictional surfaces of the rollers and the spacing between the adjacent rollers, or both, are controlled to effectively separate the soft shellfish viscera from the soft adductor muscle of the shellfish without significant damage to the muscles.

U.S. Pat. No. 5,108,342, issued to George Lapeyre, Brent Ledet, and James E. Saul, Jr., is entitled "High Yield Peeling Means And Method For Uncooked Warm-Water Shrimp". The '342 patent discloses improved machinery and methods for peeling raw, warm-water shrimp to solve the prior art problems of scarring of the shrimp meat and removing of an excess of the edible meat. A critical nip angle of between about 21° and 33° is produced by an insert nip-forming roller having a smaller diameter than conventionally used in the prior art, to considerably improve shrimp appearance while increasing the yield of shrimp meat. Attention is also given to the length and surface configuration of the insert rollers. With at least three axially aligned insert sections, better roller support prevents bowing and lengthens life. Selection of different axially disposed surface configurations permits special-purpose treatment of shrimp. For example, initial removal of waste is expedited by knurled surface sections, and final treatment by smoother sections prevents disfiguration of the peeled shrimp meat.

In the Ledet Patent 5,120,265, there is disclosed an apparatus and method for improving the yield of peeled shrimp meat obtained with roller-type peeling machinery. In the '265 patent, the yield increase is achieved by means of critical interacting operating relationships in the peeling action between power rollers, intermediate rollers, and insert rollers, expressed in terms of relative roller diameters. Preferred sets of rollers are identified that significantly increase the yields of cold water Pandalus species of shrimp in sizes of 90/kg to 350/kg over conventional commercial rollers. The high throughput quantity of the peelers is not seriously compromised and may be even increased by the ability to provide more peeling channels in a conventional size peeling tray by replacement with smaller diameter power rollers. The preferred roller sets for use in current standard commercial equipment, without other changes, has lower power rollers of 2.5 inch (6.4 cm) diameter, intermediate upper channel forming rollers of 2 inch (5 cm) diameter and insert rollers of 7/16 inch (1.1 cm) diameter. The method of establishing critical roller diameters provided by this invention permits adaption of the feature of obtaining highest yields feasible with critical roller diameter selections for various conditions encountered in the shrimp peeling industry or at a particular peeling site, including product variations from different shrimp catches, sizes, species, etc.

U.S. Pat. No. 5,346,424, issued to Chiu et al., discloses an automatic size-grading and shrimp peeling machine for shrimp. The automatic grading machine includes a plate-partition conveyor mounted to a slanting platform. The slanting platform is mounted with at least three conveying screw shafts coupled with the plate-partition conveyor and a plurality of feeding pipes of peeling machine. The automatic grading machine is mounted on a machine supporting frame so as to have all feeding ports mounted over the peeling machine, which includes at least three peeling units. Each unit includes a large swing peeling roller and two small revolving peeling rollers; a pressing roller and at least one squeezing wheel are mounted between two small revolving peeling rollers. The squeezing wheel and the pressing roller are mounted parallel to each other, but perpendicular to the small revolving peeling rollers.

BRIEF SUMMARY OF THE INVENTION

One of the problems that has always faced shrimp peeling machines is that of increasing yield while minimizing damage to the shrimp. The present invention is directed to an improved shrimp peeling arrangement featuring larger and smaller rollers with a better geometry, with less residence time for the shrimp in the peeling apparatus, and therefore minimized damage. The present invention has particular utility in peeling Pandalus Borealis variety shrimp.

The present invitation provides an improved shrimp peeling apparatus that includes a support frame with a first plurality of rollers that is supported by the frame and wherein the central longitudinal axis of each of the rollers of the first plurality lies in a common inclined plane.

A second plurality of insert rollers is supported by the first plurality of rollers, wherein the diameter of each of the first plurality of rollers is much greater than the diameter of each of the second plurality of insert rollers.

As seen in an end view of the larger diameter rollers (see FIG. 4), an angle is formed by a line intersecting the central longitudinal axis of one of the second plurality of insert rollers and the central axis of one of the first plurality of larger diameter rollers with a plane defined by the axes of the larger diameter rollers. The angle is preferably between about 20 and 32 degrees (see arrow 36 in FIG. 4).

With an insert roller nested in the gap between adjacent larger diameter rollers, peeling nips are formed between the larger diameter rollers and each side of the insert roller. Because the larger diameter rollers are coplanar, unlike in conventional peelers, the nips are formed with a more vertically inclined opening that allows gravity to provide more assistance in introducing shrimp into the peeling nips. Furthermore, both sides of the insert roller can be used to peel shrimp.

A drive mechanism is provided for rotating the larger diameter rollers in alternating rotational directions.

The apparatus can further comprise idler rollers that are positioned to support the larger diameter rollers. The larger diameter rollers have upper and lower end portions. The idler rollers are positioned at the lower end portions of the larger diameter rollers. Besides supporting the larger diameter rollers, the idler rollers precisely maintain the spacing between adjacent rollers and their positions relative to the frame.

Spray heads can be positioned above the smaller diameter insert rollers at intervals for spraying liquid at the smaller diameter insert rollers to control travel speed of the shrimp from the higher "input" end portion of the apparatus to the lower "output" end portion thereof.

A row of restraining rollers fixedly supported across the width of the peeling apparatus slightly above the lower "output" end portion of the larger diameter rollers prevents the larger diameter rollers from bouncing out of position as debris works its way between the insert rollers and the larger diameter rollers.

Longitudinally extending dividers placed above and in close proximity to the larger diameter rollers and along their length prevent shrimp from riding over the larger diameter rollers and confine the shrimp in the peeling nip channel.

The drive mechanism can include the drive members that engage the upper end of the larger diameter rollers. The drive mechanism can include a smaller diameter cylindrically-shaped shaft of each roller and a drive member that engages the cylindrically-shaped shaft.

The drive member can include a motor drive and flexible belts that engage the motor drive and larger diameter rollers. The motor is preferably a computer controlled vector drive motor, which enables variation of roller rotation, such as speed and angular stroke length, with variations in shrimp grade and type. Use of the computer controlled vector drive motor enables the angular rotation to be varied from one stroke to the next, enabling even wear patterns for rollers.

The drive member can also include a plurality of gear boxes that interface the larger diameter rollers with a vector drive type motor. The drive member can include a motor drive that is preferably a vector drive-type motor and a plurality of belts extending between adjacent pairs of the larger diameter rollers with one belt.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 5 is a fragmentary perspective view of the preferred embodiment of the apparatus of the present invention showing a divider portion thereof;

FIG. 6 is another fragmentary perspective view of the preferred embodiment of the apparatus of the present invention illustrating a divider;

FIG. 7 is an fragmentary elevational view of the preferred embodiment of the apparatus of the present invention illustrating a divider;

FIG. 8 is a sectional view taken along lines 8—8 of FIG. 7;

DETAILED DESCRIPTION OF THE INVENTION

Figure 1:
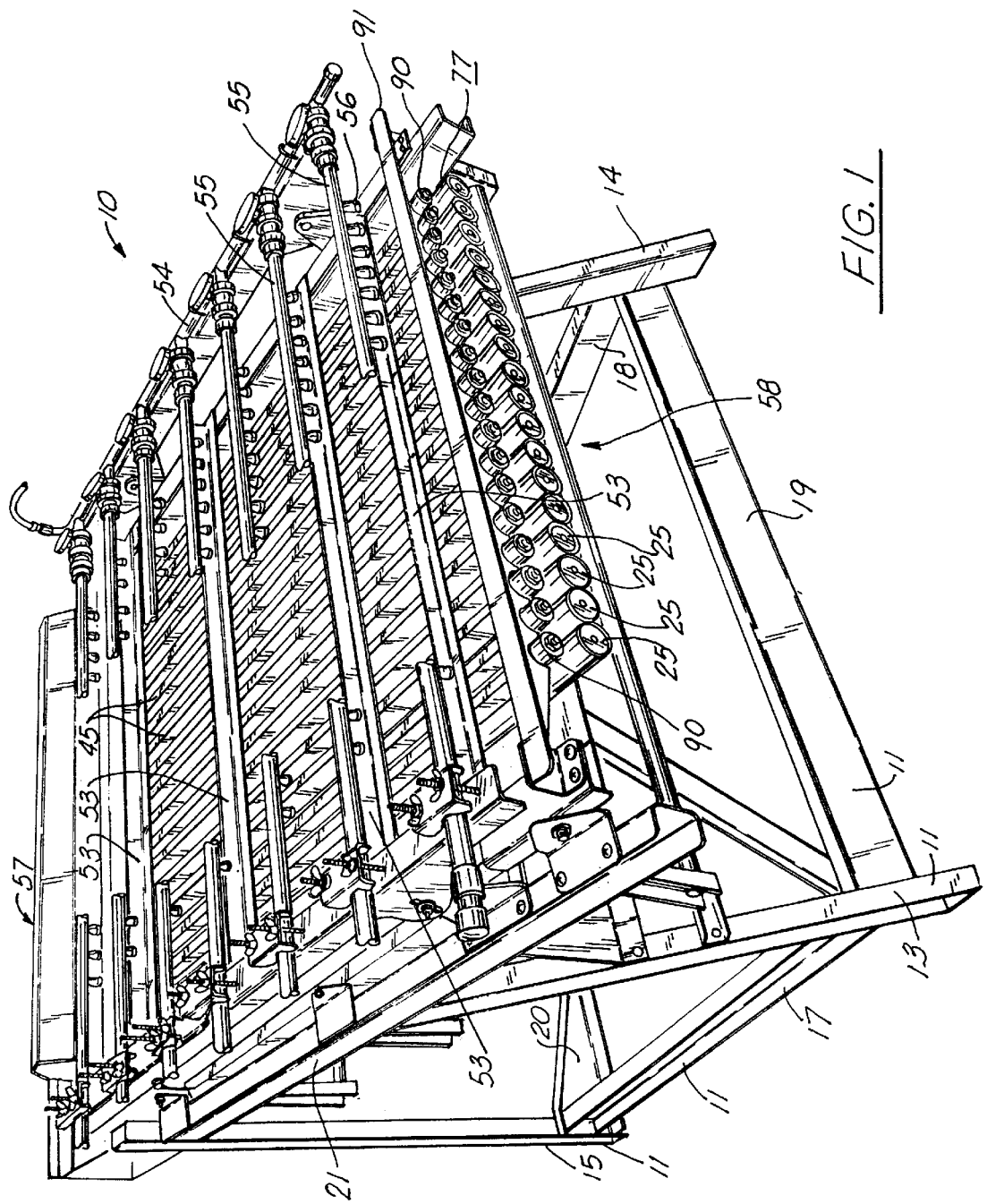
FIG. 1 is a perspective view of the preferred embodiment of the apparatus of the present invention.
Figure 2:
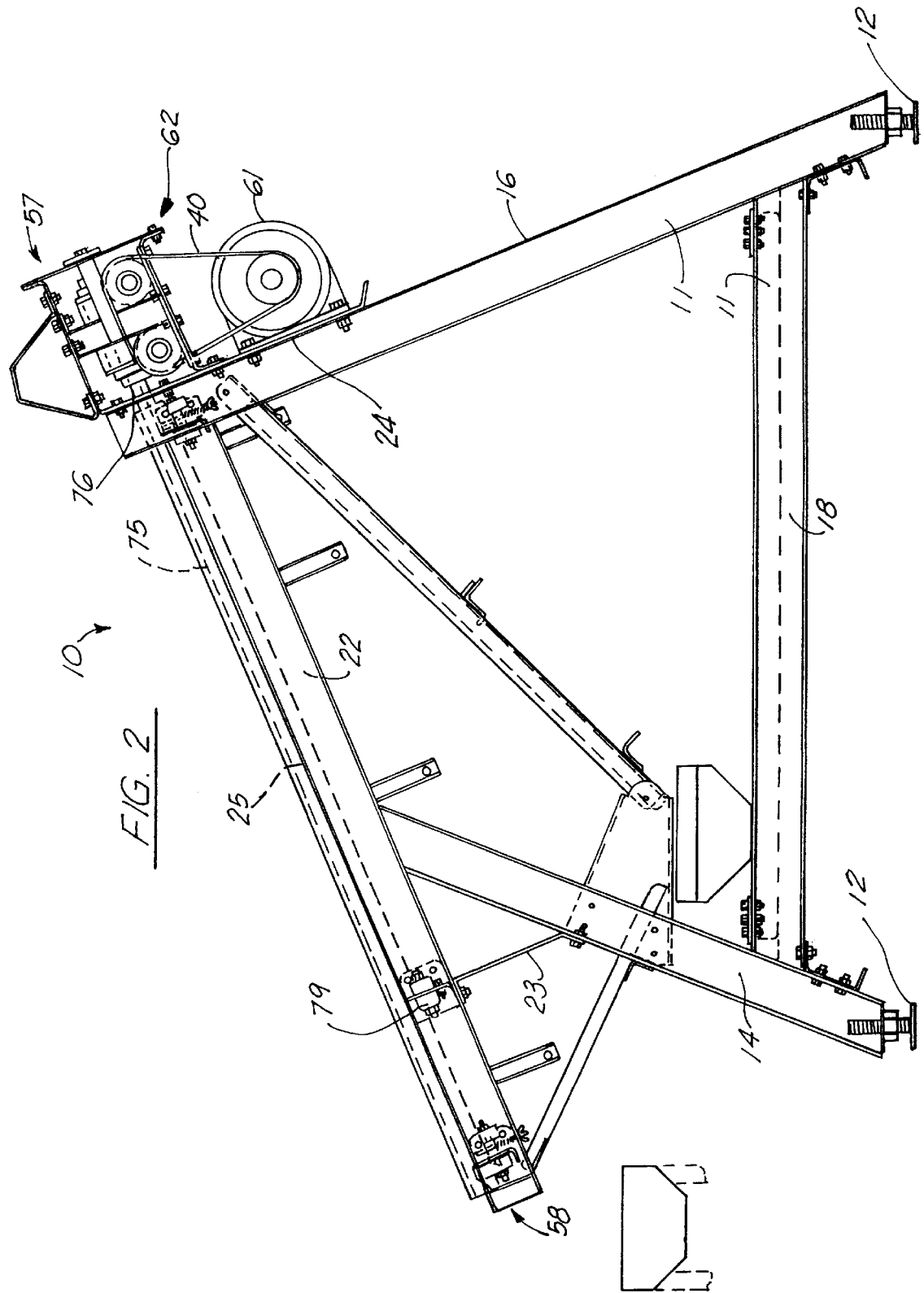
FIG. 2 is a side elevational view of the preferred embodiment of the apparatus of the present invention.

FIGS. 1–2 show generally the preferred embodiment of the apparatus of the present invention designated generally by the numeral 10. Shrimp peeler apparatus 10 includes a frame 11 having a plurality of supporting feet 12 attached to diagonally extending support legs 13, 14, 15, 16. Horizontal beams 17, 18 extend respectively between the front legs 13, 14 and the rear legs 15, 16. Horizontal beam 19 extends between front legs 13 and 14, horizontal beam 20 extends between rear legs 15, 16.

Figure 10:
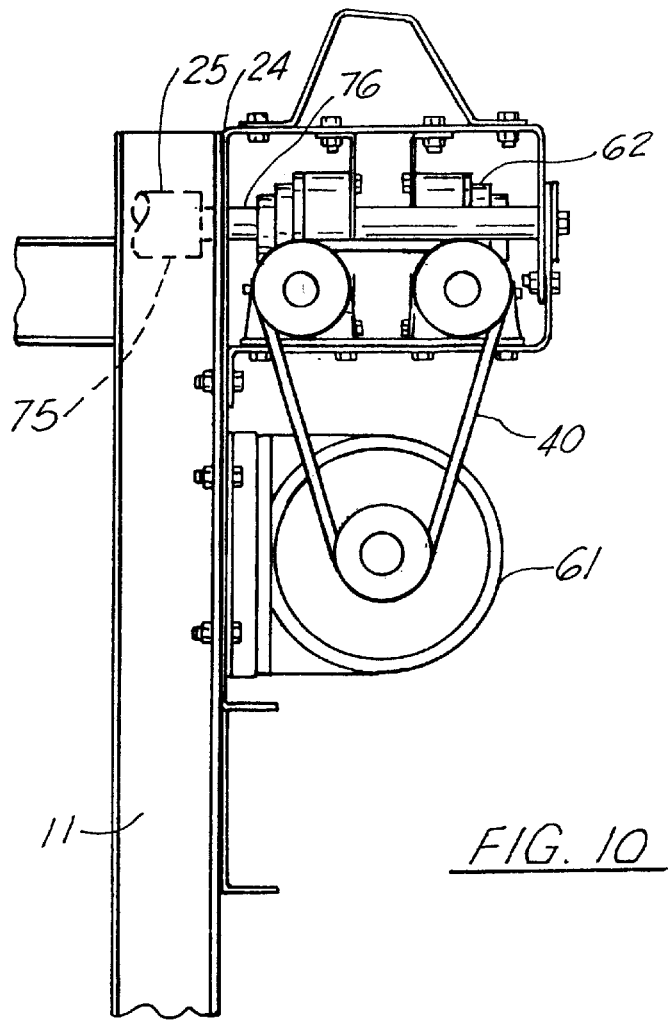
FIG. 10 is a fragmentary side view of the preferred embodiment of the apparatus of the present invention showing the motor drive portion thereof.

Frame 11 includes upper inclined plates 21, 22. Transverse plates 23, 24 are spaced across frame 11, connecting between beams 21 and 22. The frame 11 supports a plurality of rollers including larger diameter rollers 25, typically polymeric or rubber-coated with coating 77, and smaller diameter insert rollers 26, typically stainless steel (see FIG. 3). The larger diameter roller 25 has a larger diameter section 75 along most of its length at one end (as shown in FIG. 10) and a smaller diameter shaft 76 extending through back plate 24 into a transmission 62 at the upper end of peeler apparatus 10.

A motor 61 drives the larger diameter rollers through a drive train including pulleys, a belt 40, and the transmission 62. The drive assembly is attached to the frame 11 at plate 24. The larger diameter rollers 25 are thus supported at the upper input end 57 of the peeler 10 at the transmission 62.

Figure 14:
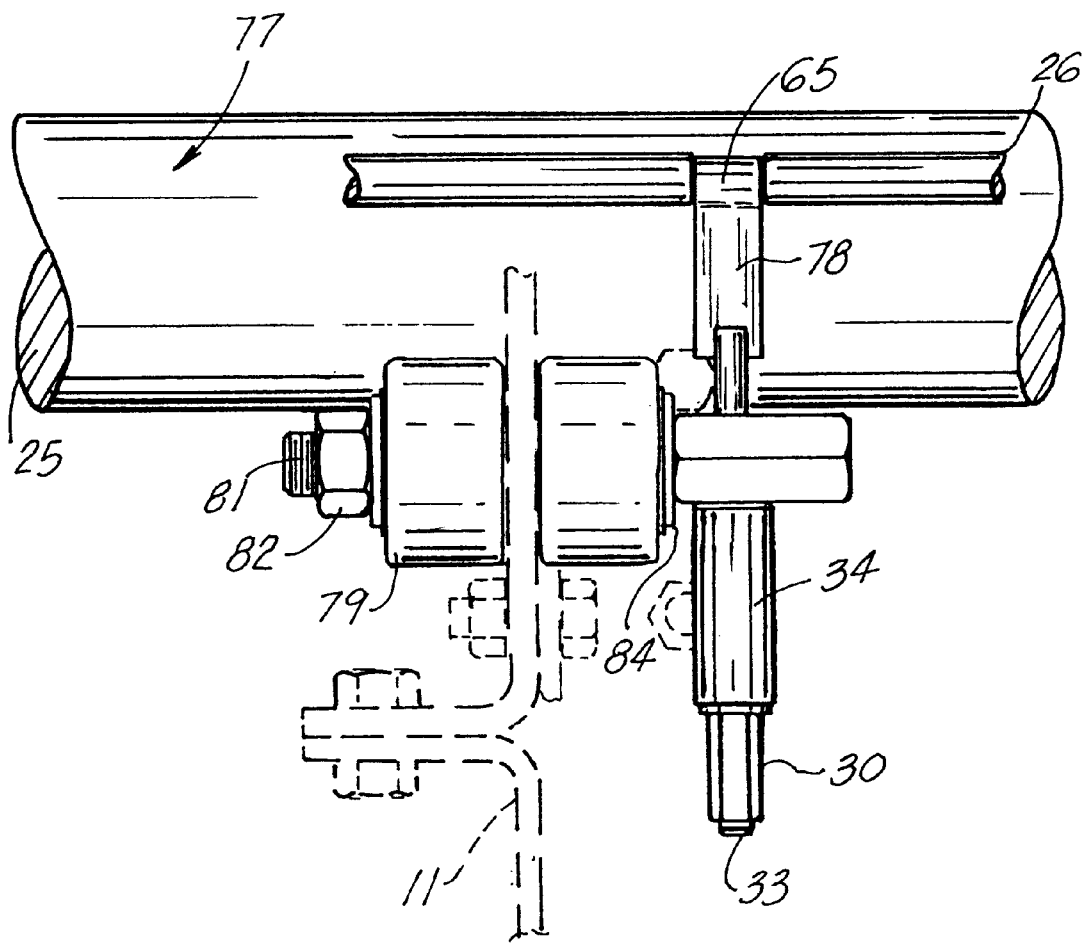
FIG. 14 is a fragmentary side view of the preferred embodiment of the apparatus of the present invention showing an idler roller.

Support idler rollers 79 near the lower exit end 58 of the peeler 10 position and support the larger diameter rollers 25 from below. The idler rollers 79 (shown in more detail in FIG. 14) are rotatably attached to the frame 11 across the width of the peeler 10. Each pair of idler rollers 79 supports two adjacent larger diameter rollers 25. The idler rollers are mounted on a rod 81 threaded at one end for fastening hardware such as nut 82 and washers 84.

Figure 3:
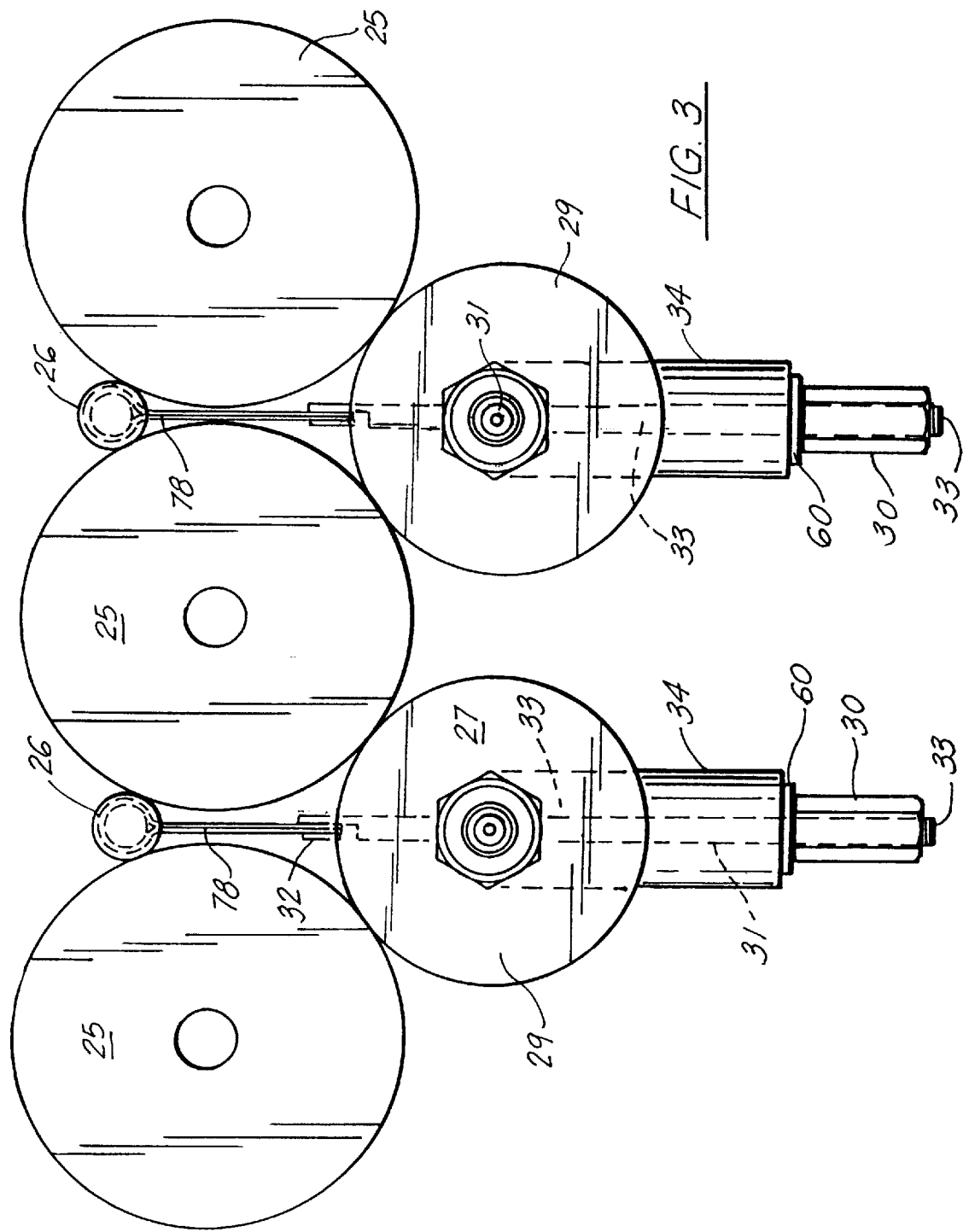
FIG. 3 is a fragmentary frontal view of the preferred embodiment of the apparatus of the present invention illustrating the large and small roller arrangement and the insert roller hold down assembly.

Hold down assembly 27 includes a roller 29 that engages the bottom of two adjacent larger diameter rollers 25 as shown in FIG. 3. The hold down rollers 29 are supported by a transverse barrel 31 slideably mounted on threaded shaft 33 suspended from a hold down member 78. Tension can be applied to shaft 33 using adjustment nut 30 that threadably engages threaded shaft 33. Sleeve 34 (polymeric, e.g., urethane) bottoms against nut 30 through a washer 60. The top of sleeve 34 supports barrel 31. A connection is formed at 32 between hold down member 78 and threaded shaft 33. The particular construction of the hold down assembly 27 that includes rollers 29, hold down member 78, barrel 31, shaft 33 and nut 30 is shown more particularly in co-pending patent application Ser. No. 09/145,693, filed on even date herewith, and entitled "Shrimp Peeling Apparatus Roller Hold Down Assembly", which is incorporated herein by reference.

To prevent the larger diameter rollers 25, which are supported near the output end from below by the support idler rollers 79, from bouncing about during operation because of debris working its way between adjacent larger diameter rollers, a row of restraining rollers 90 is provided (see FIG. 1). The restraining rollers 90 are affixed to the stationary transverse beam section 91 at the output end 58 of the larger diameter rollers 25. Each restraining roller resides slightly above a corresponding larger diameter roller 25. The restraining rollers 90 limit the upward motion of the larger diameter rollers, thereby maintaining them in general alignment even in the presence of debris between adjacent peeling rollers 25, 26.

Figure 4:
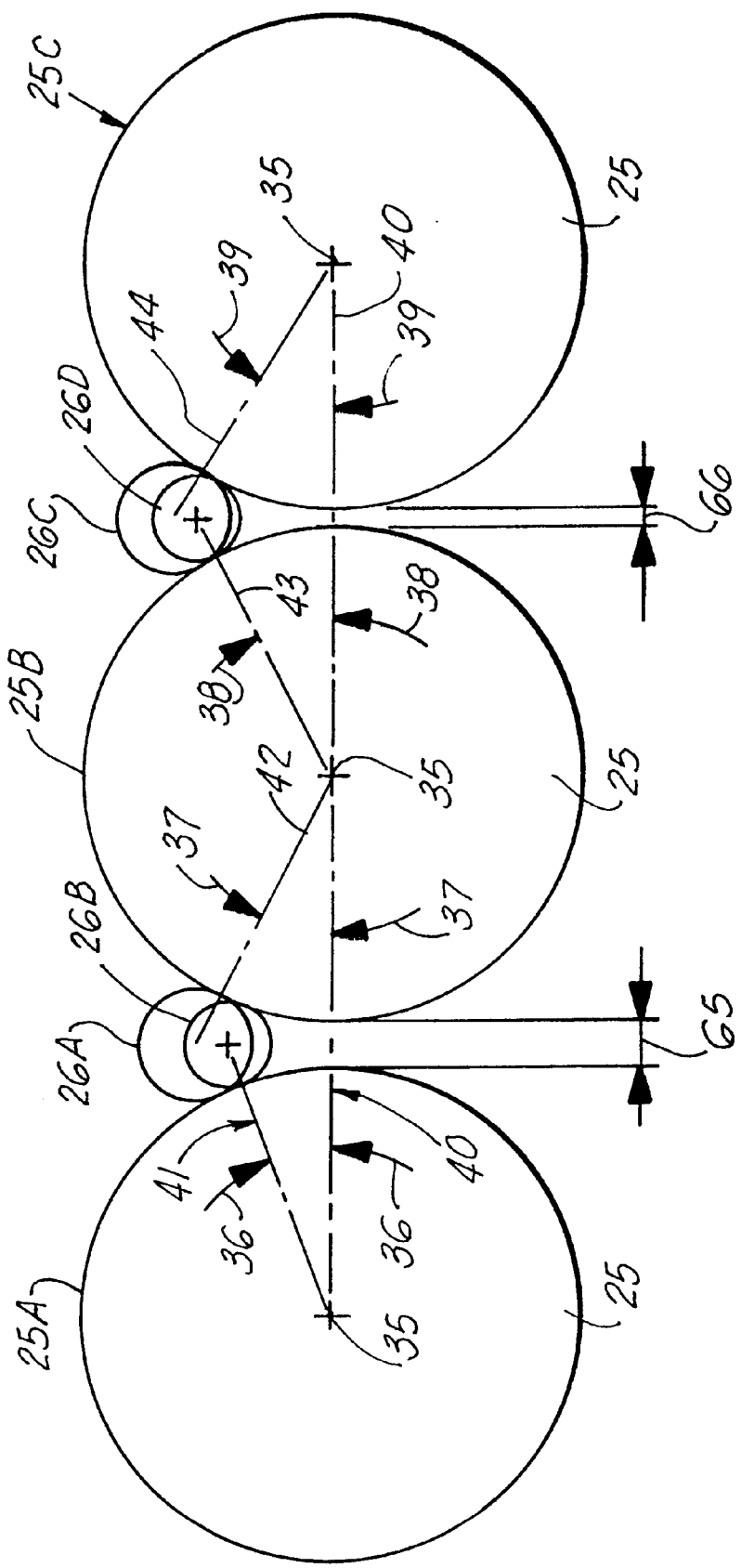
FIG. 4 is a schematic frontal view of the roller geometry illustrating the large rollers, small insert rollers, and respective angular orientations.

In FIG. 4, an improved geometry is shown for defining the relative positions between the larger diameter rollers 25 and the smaller diameter insert rollers 26. In FIG. 4, the center of rotation of larger diameter rollers 25 is indicated by the numeral 35. In FIG. 4, there are three larger diameter rollers 25A, 25B, 25C shown for purposes of illustration.

Different smaller diameter insert rollers 26A, 26B, 26C, 26D are schematically represented for comparison. Either of the insert rollers 26A or 26B could be selected for placement between larger diameter rollers 25A, 25B. The nip angle varies with the change in diameter between insert rollers 26A and 26B. The insert roller 26A is thus larger in diameter than the insert roller 26B. Both of the smaller diameter insert rollers 26A, 26B are much smaller in diameter than the larger diameter rollers 25A, 25B as shown.

The purpose of FIG. 4 is to illustrate schematically that different smaller diameter insert rollers 26A, 26B and different spacing between rollers 25 such as 25A, 25B, 25C can be used to provide differing geometries as illustrated by the curved arrows 36, 37, 38, 39.

The curved arrow 36 represents the angle formed by reference line 40 that intersects the center of rotation 35 of the plurality of larger diameter rollers 25 and reference line 41 in a plane normal to the roller axes. Reference line 40 is a reference line that thus defines a plane intersecting the centers of rotation 35 of the larger diameter rollers 25. The reference line 41 is a line that extends from the center of rotation 35 of the left hand larger diameter roller 25A in FIG. 4 to the center of rotation of smaller diameter roller 26B.

Reference line 42 is a line drawn between the center of rotation 35 of larger diameter roller 25B and the center of rotation of smaller diameter roller 26A. Because the roller 26A has a larger diameter than the diameter of roller 26B, the angle represented by arrows 36 is smaller than the angle represented by arrows 37.

The reference line 43 forms an angle 38 with reference line 40. The angle 38 is between the plane 40 and the line 43 that extends between center of rotation 35 of larger diameter roller 25B and the center of rotation of smaller diameter roller 26D. The angle 38 is smaller than the angle 39 formed between reference line 40 and reference line 44 due to the differences in diameter between rollers 26C and 26D. The reference 44 is a reference line that forms an angle with reference line 40 to define the angle 39.

Each of the angles 36, 37, 38, 39 is of a different value because of the diameter of the particular smaller diameter roller selected, 26A, 26B, 26C, 26D. In the preferred embodiment, these angles 36–39 are preferably between about 20 and 32 degrees. The angles 36, 37, 38, 39 can also be varied by changing the spacing between adjacent larger diameter rollers 25. In FIG. 4, the spacing 65 between rollers 25A and 25B is greater than the spacing 66 between rollers 25B and 25C. Still, the angles 36, 37, 38, 39 are preferably between 20 and 32 degrees when spacing between rollers 25 is varied. That spacing, taken in combination with the selected diameter of smaller roller 26, controls the angle value for angles 36, 37, 38, 39. The spacing between rollers 25 is preferably between about 0.1 and 0.25 inches. The diameter of rollers 25 is preferably between about 2 and 3 inches. Insert rollers 26 are preferably between 7/16 and 9/16 inches in diameter.

In FIGS. 1 and 5–9, there can be seen a plurality of dividers 45, each divider extending longitudinally along the top of a larger diameter roller 25. There are preferably a plurality of eighteen (18) larger diameter rollers 25, each having a center of rotation 35 that occupies a common plane 40. In the preferred embodiment, each of these larger diameter rollers 25 has a divider 45 that is fitted to the uppermost surface of the respective larger diameter roller 25 (see FIG. 9).

In FIGS. 5–8, each divider 45 provides a concave surface 46 that is of a curvature that conforms to the outer curved surface of its larger diameter roller 25. Each divider 45 has a generally flat top surface 51, a pair of flat side surfaces 47, 48, and a pair of beveled or inclined side surfaces 49, 50. Each divider 45 can have a plurality of sockets 52 that define attachment positions for affixing the dividers 45 to transversely extending supports 53 on frame 11. Threaded fasteners such as self tapping screws (not shown) can be used to affix each divider 45 to transverse support 53 at sockets 52 and at intervals along the length of each divider 45. Sockets 52 communicate with top surface 51 of dividers 45.

Figure 9:
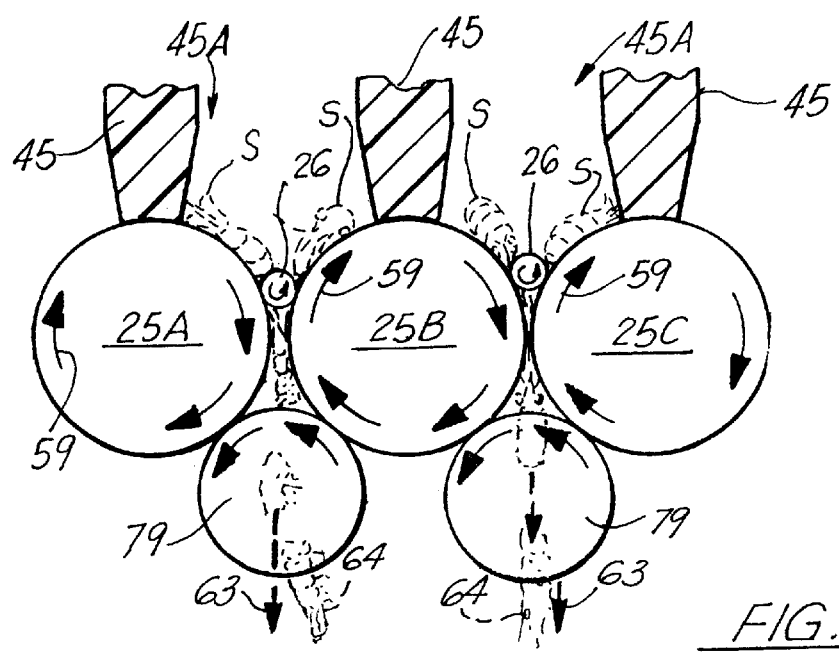
FIG. 9 is a schematic frontal view of the roller geometry illustrating the large rollers, small insert rollers, supporting idler rollers, and dividers.
Figure 11:
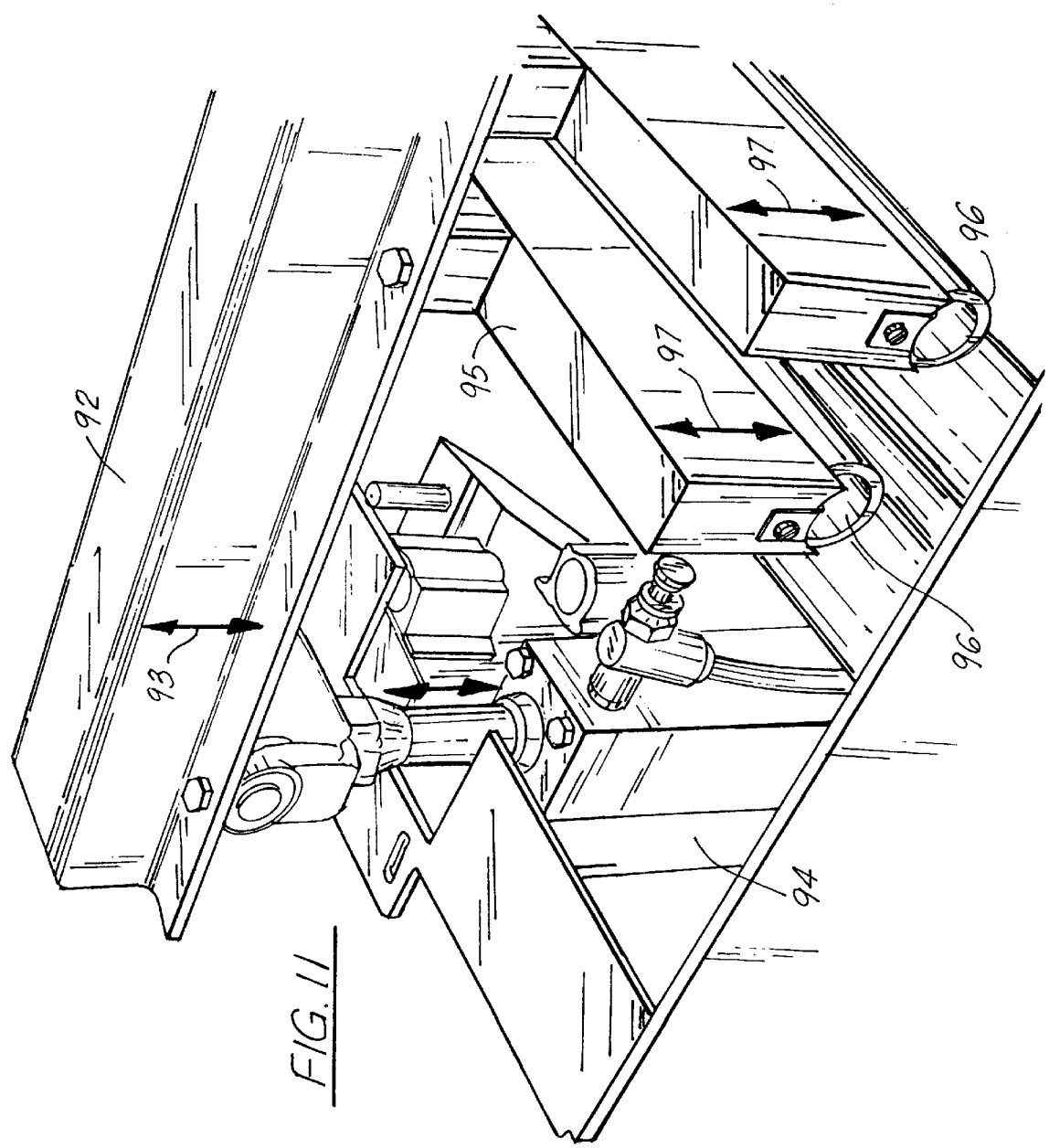
FIG. 11 is a partial perspective view of the preferred embodiment of the apparatus of the present invention illustrating the pressure frame portion.
Figure 12:
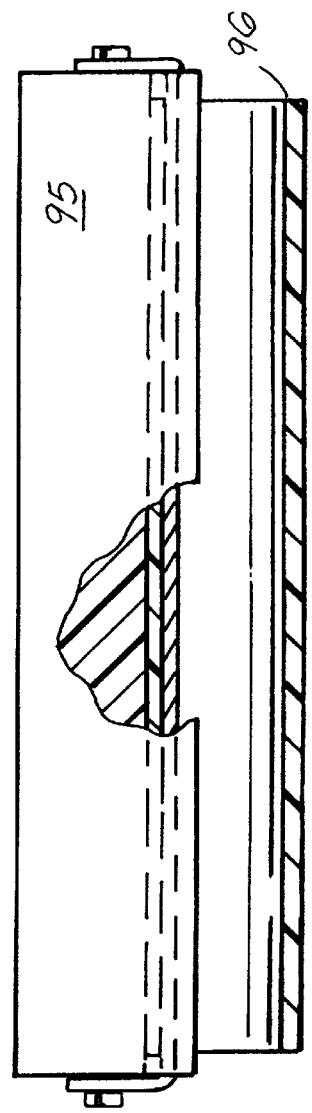
FIG. 12 is a partial perspective view of the foot and flexible contact element of the pressure frame of FIG. 11.
Figure 13:
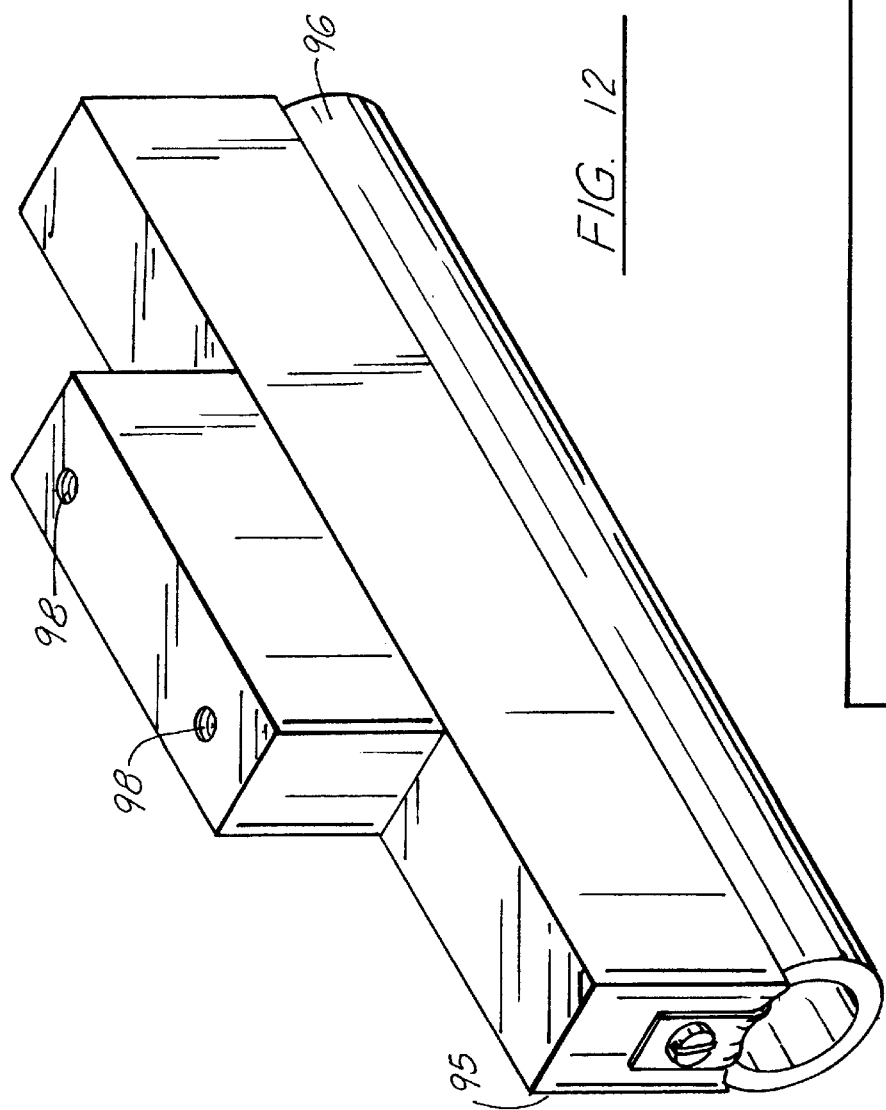
FIG. 13 is an elevational view of the foot and flexible contact element of the pressure frame of FIGS. 11 and 12.

In FIG. 9, a pair of adjacent dividers 45 form a channel 45A that retains shrimp S to be peeled in a space that extends from one larger diameter roller such as the lefthand roller 25A in FIG. 9 to the adjacent larger diameter roller such as the roller 25B in FIG. 9. In such a situation, peeling of the shrimp S in between two adjacent dividers 45 is accomplished by the single smaller diameter insert roller 26 and the two adjacent larger diameter rollers 25A, 25B. The dividers 45 prevent shrimp from traveling laterally from a roller such as 25A to roller 25B and then to roller 25C. This configuration reduces peel time and minimizes damage to the shrimp S.

Water can be supplied to rollers 25, 26 at a position in between adjacent dividers 45. A water supply header 54 carries water to a plurality of transversely extending conduits 55. Each of the conduits 55 carries a plurality of spray nozzles 56, preferably of the same number as smaller diameter insert rollers 26. The spray nozzles 56 preferably spray a fan spray type pattern that extends longitudinally in the direction of smaller diameter insert rollers 26. The water spray can be varied in flow rate to control the travel speed of the shrimp from input end 57 to output end 58.

During use, shrimp are input to the apparatus 10 at its upper or input end portion 57. The shrimp then travel downwardly toward the output end portion 58 of apparatus 10. During use, the rollers 25 rotate first in the rotational directions indicated schematically by arrow 59 in FIG. 9 and then in the opposite direction.

The smaller diameter insert rollers 26 are driven by static friction from contact with the surface of the larger diameter rollers and they thus rotate in the opposite direction from the larger diameter rollers. The speed and angular stroke length of the alternating clockwise and counterclockwise rotation can be computer controlled with a vector drive motor 61 (see FIG. 10) mounted on frame 11 and having a transmission 62 that forms an interface between motor 61 and the larger diameter rollers 25. Such a drive system can be seen in co-pending patent application Ser. No. 09/145,827, entitled "Improved Drive System for Shrimp Peeling Apparatus", incorporated herein by reference.

In FIG. 9, the individual shrimp S are shown in position above the interface formed by smaller diameter insert rollers 26 and larger diameter rollers 25A, 25B, 25C supported on oppositely rotating idler rollers 79. The shell of the shrimp is pinched by the nip formed between each smaller diameter insert roller 26 and an adjacent larger diameter roller 25A or 25B and separated from the meat, which is too massive to squeeze between the insert roller 26 and the larger diameter roller. In FIG. 9, the peeled shell 64 of the shrimp S is shown by arrow 63 as falling below the larger diameter rollers 25.

In FIG. 11–15, there can be seen a partial perspective view of the preferred embodiment of the apparatus of the present invention showing a shrimp pressure frame 99 arrangement that includes a transverse beam 92 that is moved up and down as shown by arrow 93 with a pair of fluid cylinders 94. A pair of fluid cylinders 94 can be mounted at opposing end portions of transverse beam 92. Beam 92 supports a plurality of longitudinally extending feet 95, each carrying a flexible contact element 96. Each of the feet 95 moves up and down as shown by arrows 97 in FIGS. 11 and 16. This motion can also be an orbital motion that moves each of the feet 95 and its tubular member 96 in a circular or oval shaped path.

Figure 15:
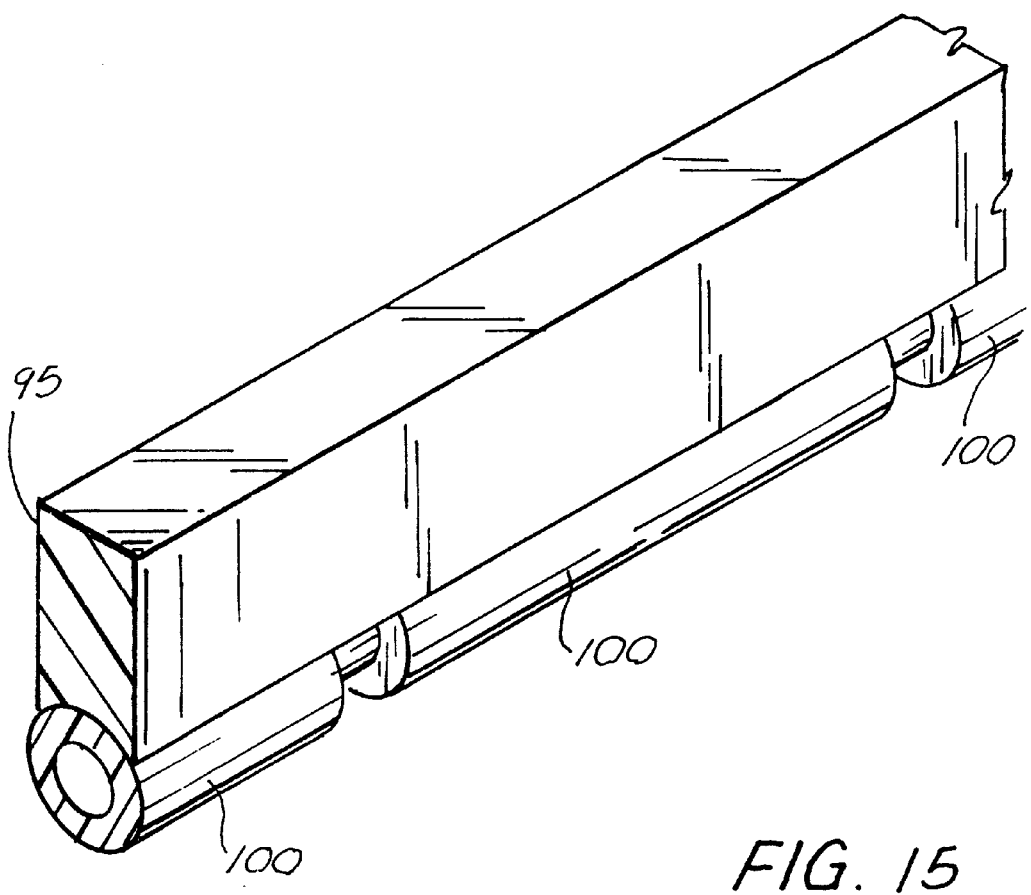
FIG. 15 is a partial perspective view of the foot and an alternate construction of the flexible contact element of the pressure frame of FIG. 11.
Figure 16:
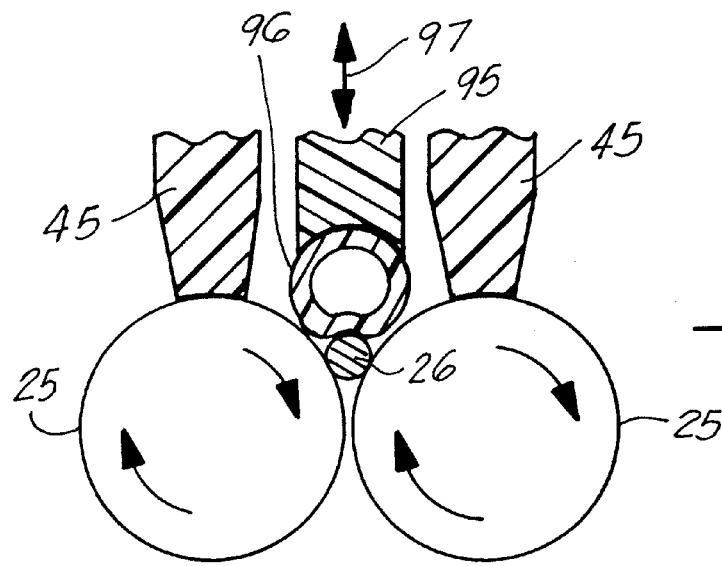
FIG. 16 is a partial frontal view of the rollers, dividers, foot and flexible contact element.

Each contact element 96 moves downwardly in between dividers 45 and into contact with the shrimp S that are resting upon the interface defined by two adjacent larger diameter rollers 25 and a smaller diameter insert roller 26. This action occurs once during each rotational stroke of the plurality of larger diameter rollers 25. This action helps push the shrimp S into the nip area between a smaller diameter insert roller 26 and an adjacent larger diameter roller 25. Each of the feet 95 can be bolted or otherwise connected at sockets 98 to transverse beam 92. In FIG. 15, the flexible contact element is comprised of a number of flexible contact element segments 100 which contact the shrimp independently.

The following table lists the parts numbers and parts descriptions as used herein and in the drawings attached hereto.

| PARTS LIST | |
|---|---|
| Part Number | Description |
| 10 | shrimp peeler apparatus |
| 11 | frame |
| 12 | feet |
| 13 | leg |
| 14 | leg |
| 15 | leg |
| 16 | leg |
| 17 | horizontal beam |
| 18 | horizontal beam |
| 19 | horizontal beam |
| 20 | horizontal beam |
| 21 | inclined beam section |
| 22 | inclined beam section |
| 23 | transverse plate |
| 24 | transverse plate |
| 25 | larger diameter roller |
| 25A | larger diameter roller |
| 25B | larger diameter roller |
| 25C | larger diameter roller |
| 26 | smaller diameter insert roller |
| 26A | smaller diameter insert roller |
| 26B | smaller diameter insert roller |
| 26C | smaller diameter insert roller |
| 26D | smaller diameter insert roller |
| 27 | hold down roller assembly |
| 29 | hold down roller |
| 30 | adjustment nut |
| 31 | transverse barrel |
| 32 | connection |
| 33 | threaded vertical shaft |
| 34 | polymeric sleeve |
| 35 | center of rotation |
| 36 | curved arrow |
| 37 | curved arrow |
| 38 | curved arrow |
| 39 | curved arrow |
| 40 | reference line |
| 41 | reference line |
| 42 | reference line |
| 43 | reference line |
| 44 | reference line |
| 45 | dividers |
| 45A | channel |
| 46 | cruved bottom surface |
| 47 | flat side surface |
| 48 | flat side surface |
| 49 | inclined side surface |
| 50 | inclined side surface |
| 51 | flat top surface |
| 52 | socket |
| 53 | transverse support |
| 54 | water supply header |
| 55 | transverse conduit |
| 56 | spray nozzle |
| 57 | input end |
| 58 | output end |
| 59 | arrow |
| 61 | motor |
| 62 | transmission |
| 63 | arrow |
| 64 | peeled shrimp shell |
| 65 | spacing |
| 66 | spacing |
| S | shrimp |
| 75 | larger diameter section |
| 76 | small diameter section |
| 77 | polymeric outer surface |
| 78 | hold down member |

-continued

PARTS LIST

| Part Number | Description |
|---|---|
| 79 | support idler roller |
| 81 | rod |
| 82 | nut |
| 84 | washer |
| 90 | restraining roller |
| 91 | transverse beam section |
| 92 | beam |
| 93 | arrow |
| 94 | fluid cylinder |
| 95 | foot |
| 96 | flexible contact element |
| 97 | arrow |
| 98 | socket |
| 99 | pressure frame |
| 100 | flexible contact segment |

The foregoing embodiments are presented by way of example only; the scope of the present invention is to be limited only by the following claims.

We claim:

1. A shrimp peeling apparatus comprising:
   a) a support frame;
   b) a first plurality of rollers supported by the frame, wherein the central longitudinal axis of each said roller of said first plurality lies in a common inclined plane;
   c) a second plurality of insert rollers supported by the first plurality of rollers;
   d) wherein the diameter of each of the first plurality of rollers is much greater that the diameter of each of the second plurality of insert rollers;
   e) wherein the angle formed by a line intersecting the central longitudinal axis of one of the second plurality of insert rollers and said common plane is between 20 and 32 degrees; and
   f) a drive mechanism for rotating the larger diameter rollers in alternating rotational directions.

2. The shrimp peeling apparatus of claim 1 further comprising idler rollers positioned underneath the larger diameter rollers for supporting the larger diameter rollers.

3. The shrimp peeling apparatus of claim 2 wherein the larger diameter rollers have upper and lower end portions, and the idler rollers are positioned at the lower end portions of the larger diameter rollers.

4. The shrimp peeling apparatus of claim 1 further comprising spray nozzles positioned above the smaller diameter insert rollers at intervals for spraying fluid at the smaller diameter insert rollers.

5. The shrimp peeling apparatus of claim 1 wherein the drive mechanism includes drive members that engage the upper end of the larger diameter rollers.

6. A shrimp peeling apparatus comprising:
   a) a support frame;
   b) a first plurality of rollers supported by the frame, wherein the central longitudinal axis of each said roller of said first plurality lies in a common inclined plane;
   c) a second plurality of insert rollers supported by the first plurality of rollers;
   d) wherein the diameter of each of the first plurality of rollers is much greater that the diameter of each of the second plurality of insert rollers; and
   e) a plurality of dividers for dividing rows of shrimp apart longitudinally so that shrimp are confined to a space in between two of the larger diameter rollers.

7. The shrimp peeling apparatus of claim 5 wherein said dividers extend longitudinally along each roller of said first plurality.

8. The shrimp peeling apparatus of claim 7 wherein said dividers extend substantially the length of the larger diameter rollers for dividing rows of shrimp apart longitudinally so that shrimp are confined to a space in between two of the larger diameter rollers.

9. The shrimp peeling apparatus of claim 8 wherein the dividers have surfaces that conform to the surface of the larger diameter rollers.

10. The shrimp peeling apparatus of claim 9 wherein the dividers have lower concave surfaces that conform to the upper surface of the larger diameter rollers.

11. A shrimp peeling apparatus comprising:
    a) a support frame;
    b) a first plurality of rollers supported by the frame, wherein the central longitudinal axis of each said roller of said first plurality lies in a common inclined plane;
    c) a second plurality of rollers that are insert rollers supported by the first plurality of rollers;
    d) wherein the diameter of each of the first plurality of rollers is much greater that the diameter of each of the second plurality of insert rollers;
    e) wherein the angle formed by a line intersecting the central longitudinal axis of one of the insert rollers and said common plane is between 20 and 32 degrees;
    f) a drive mechanism for rotating the larger diameter rollers in alternating rotational directions; and
    g) wherein each roller of the first and second plurality of rollers have rotational axes that are parallel.

12. The shrimp peeling apparatus of claim 1 further comprising restraining rollers positioned above the larger diameter rollers to limit the vertical excursion of the larger diameter rollers during peeling.

13. The shrimp peeling apparatus of claim 11 further comprising restraining rollers positioned above the larger diameter rollers to limit the vertical excursion of the larger diameter rollers during peeling.

14. The shrimp peeling apparatus of claim 6 further comprising restraining rollers positioned above the larger diameter rollers between at the output end of the peeler and at the lower end of the dividers.

15. The shrimp peeling apparatus of claim 12 wherein each larger diameter roller is supported by three roller supports that include two idler rollers and a restraining roller.

16. The shrimp peeling apparatus of claim 15 wherein two of the supports engage the roller below the roller's center of rotation.

17. The shrimp peeling apparatus of claim 15 wherein one of the supports engages the roller above the roller's center of rotation and at least one of the supports engages the roller below the roller's center of rotation.

18. The shrimp peeling apparatus of claim 15 wherein at least one of the idler rollers defines a roller support.

19. The shrimp peeling apparatus of claim 18 wherein two of the idler rollers define roller supports.

20. The shrimp peeling apparatus of claim 15 wherein a restraining roller defines one of the roller supports.

21. The shrimp peeling apparatus of claim 6 further comprising a pressure frame for urging shrimp into contact with the rollers, said frame including longitudinal feet.

22. The shrimp peeling apparatus of claim 11 further comprising a pressure frame for urging shrimp into contact with the rollers, said frame including longitudinal feet.

23. The shrimp peeling apparatus of claim 21 wherein each foot fits in between a pair of dividers.

24. The shrimp peeling apparatus of claim 22 wherein each foot fits in between a pair of dividers.

25. The shrimp peeling apparatus of claim 21 wherein the feet carry flexible elements.

26. The shrimp peeling apparatus of claim 22 wherein the feet carry flexible elements.

27. The shrimp peeling apparatus of claim 25 wherein the elements are one piece.

28. The shrimp peeling apparatus of claim 25 wherein the flexible elements are segmented.

29. The shrimp peeling apparatus of claim 21 wherein the pressure frame moves in an orbital path.

30. The shrimp peeling apparatus of claim 21 wherein the pressure frame moves up and down along a generally linear path.

31. The shrimp peeling apparatus of claim 21 wherein the pressure frame is pneumatically powered.

32. A shrimp peeling apparatus comprising:

a) a support frame;

b) a first plurality of rollers supported by the frame, wherein the central longitudinal axis of each said roller of said first plurality lies in a common inclined plane;

c) a second plurality of rollers that are insert rollers supported by the first plurality of rollers;

d) wherein the diameter of each of the first plurality of rollers is much greater that the diameter of each of the second plurality of insert rollers;

e) wherein the angle formed by a line intersecting the central longitudinal axis of one of the insert rollers and said common plane is between 20 and 32 degrees;

f) a drive mechanism for rotating the larger diameter rollers in alternating rotational directions; and g) a plurality of dividers for dividing rows of shrimp apart longitudinally so that shrimp are confined to a space in between two of the larger diameter roller; and h) a pressure frame for urging shrimp into contact with the rollers, said frame including feet, each positioned in between two dividers.

33. The shrimp peeling apparatus of claim 32 wherein the feet carry flexible elements.

34. The shrimp peeling apparatus of claim 33 wherein the flexible elements are one piece.

35. The shrimp peeling apparatus of claim 33 wherein the flexible elements are segmented.

36. The shrimp peeling apparatus of claim 32 wherein the pressure frame moves in an orbital path.

37. The shrimp peeling apparatus of claim 32 wherein the pressure frame moves up and down along a generally linear path.

38. The shrimp peeling apparatus of claim 32 wherein the pressure frame is pneumatically powered.

* * * * *